US012383899B2

(12) United States Patent
Gebauer et al.

(10) Patent No.: US 12,383,899 B2
(45) Date of Patent: Aug. 12, 2025

(54) SYSTEM AND METHOD FOR A PHARMACEUTICAL PRODUCT

(71) Applicant: Cytiva Sweden AB, Uppsala (SE)

(72) Inventors: Klaus Gebauer, Uppsala (SE); Markus Pitkanen, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 1145 days.

(21) Appl. No.: 17/277,046

(22) PCT Filed: Sep. 27, 2019

(86) PCT No.: PCT/EP2019/076250
§ 371 (c)(1),
(2) Date: Mar. 17, 2021

(87) PCT Pub. No.: WO2020/065040
PCT Pub. Date: Apr. 2, 2020

(65) Prior Publication Data
US 2022/0032301 A1 Feb. 3, 2022

(30) Foreign Application Priority Data
Sep. 27, 2018 (GB) ..................................... 1815798

(51) Int. Cl.
*B01L 3/00* (2006.01)

(52) U.S. Cl.
CPC ... *B01L 3/502738* (2013.01); *B01L 3/502715* (2013.01); *B01L 3/502746* (2013.01);
(Continued)

(58) Field of Classification Search
CPC ............................................... B01L 2400/0638
See application file for complete search history.

(56) References Cited

U.S. PATENT DOCUMENTS 4,618,586 A 10/1986 Walker
2003/0173291 A1 9/2003 Schimel
(Continued)

FOREIGN PATENT DOCUMENTS

CN 105814352 A 7/2016
EP 1714695 A1 10/2006
(Continued)

OTHER PUBLICATIONS

Office Action Issued in Japanese Patent Application No. 2021-517424, dated Jul. 31, 2023 with English Translation (13 Pages).
(Continued)

*Primary Examiner* — Natalia Levkovich
(74) *Attorney, Agent, or Firm* — Eversheds-Sutherland (US) LLP

(57) ABSTRACT

The present disclosure relates to a biological fluid processing system and method. The system comprises a fluid processing device comprising at least one fluid path, a pump for providing a pressure in the at least one fluid path, a valve arranged along said fluid path and a first actuator arranged to control the valve to assume a desired opening state of said fluid path. The biological fluid processing system comprises further a processing interface comprising a pump drive for driving the pump of the fluid processing device, and a processing control element comprising a pump control system arranged to control at least the pump drive and a valve control system arranged to control the first actuator. The system is modular. The fluid processing device is comprised in a fluid processing device module having a predetermined fluid processing device configuration. The processing interfaces have a predetermined processing interface configuration. The processing control element is arranged to receive information relating to the predetermined processing interface configuration of the processing interface module and/or
(Continued)

the predetermined fluid processing device configuration of the fluid processing device module and control the at least one pump drive and/or the valve based on the received information relating to the predetermined fluid processing device configuration and the predetermined processing interface configuration.

15 Claims, 9 Drawing Sheets

(52) U.S. Cl.
CPC . *B01L 2200/028* (2013.01); *B01L 2200/0689* (2013.01); *B01L 2300/022* (2013.01); *B01L 2400/0481* (2013.01); *B01L 2400/0487* (2013.01); *B01L 2400/0638* (2013.01); *B01L 2400/0655* (2013.01)

(56) References Cited

U.S. PATENT DOCUMENTS

2004/0248077 A1 12/2004 Rodriguez Rilo et al.
2005/0158701 A1 7/2005 West
2007/0166199 A1 7/2007 Zhou et al.
2011/0020856 A1 1/2011 Poo et al.
2016/0319955 A1 * 11/2016 Gebauer ................ C12M 41/40

FOREIGN PATENT DOCUMENTS

EP 2330181 A1 6/2011
JP 2009-524054 A 6/2009
JP 2017-509834 A 4/2017
JP 2018-524568 A 8/2018
WO 2007/084425 A2 7/2007
WO 2012/171030 A2 12/2012
WO 2015/095658 A1 6/2015
WO 2017/123855 A1 7/2017

OTHER PUBLICATIONS

Office Action Issued in Chinese Patent Application No. 201980063932.6, dated Nov. 14, 2022 with English Translation (25 Pages).
Search Report Issued in Chinese Patent Application No. 201980063932.6, dated Nov. 4, 2022 (2 Pages).
PCT International Search Report and Written Opinion for PCT/EP2019/076250 mailed Jan. 13, 2020 (10 pages).
Great Britain Search Report for GB Application No. 1815798.2 mailed Mar. 29, 2019 (4 pages).

* cited by examiner

SYSTEM AND METHOD FOR A PHARMACEUTICAL PRODUCT

CROSS REFERENCE TO RELATED APPLICATIONS

This application claims the priority benefit of PCT/EP2019/076250, filed on Sep. 27, 2019, which claims the benefit of Great Britain Application No. 1815798.2, filed on Sep. 27, 2018, the entire contents of which are incorporated by reference herein.

TECHNICAL FIELD

The present disclosure relates to biological fluid processing system comprising a fluid processing device, a processing interface and a processing control element.

The present disclosure further relates to a method for setting up a biological fluid processing system comprising a fluid processing device, a processing interface and a processing control element.

BACKGROUND

Biopharmaceutical products, also called biologics, are a wider range of complex molecules intended for therapeutic or diagnostic use. Biologics are typically made by living organisms or cells, such as for example vaccines, recombinant therapeutic proteins, monoclonal antibodies etc. These products are typically obtained by culturing a host cell in a bioreactor to produce the drug substance of interest, followed by liquid treatment steps such as clarification of the cell culture, filtration and chromatography steps. Biologic drug products often require parenteral administration by infusion or injection. Thereby, a tightly controlled, high quality manufacturing and distribution network including highly specialized manufacturing, special storage and handling is needed to ensure drug effectiveness and safety.

The past decade has seen a significant shift in the nature of the products being manufactured and sold by the innovative biopharmaceutical industry. The global biopharmaceutical drug portfolio of today reflects a drastic expansion in the number, variety and specificity of biologics. An example illustrating this expansion is the emergence of personalized medicine; products that target a specific or population of patients or individual patients. These development trends provide for biopharmaceutical products with limited production runs, highly specific manufacturing requirements, and genotype-specific products. Another factor increasing the number of drug products and manufacturing processes required, yet decreasing the quantity and scale of manufacturing these products is the fact that patent rights for successful biopharmaceutical drugs are starting to expire, hereby opening up for a market of many generic biopharmaceuticals, called biosimilars. To manage cost, quality and speed of bringing these new, improved and more cost-efficient treatments to patients, there is a need for continuous improvement of the efficiency and effectiveness of production biopharmaceutical manufacturing and associated technology.

When it comes to manufacture of biopharmaceutical products, the manufacturing process as such is important for the characteristics and quality of the produced drug product. The manufacturing process includes the sequence and design of processing steps and operating parameters, however, it includes also the processing setup in terms of type, configuration and installation of the manufacture system as well as general manufacturing practices. For example, practices for setting up for manufacture, by installing and qualifying manufacturing systems and components, may have an impact on the final biopharmaceutical product. For example, wrong or incomplete installations may cause contaminations, fluid leakage, malfunction or alteration of processing steps and their outcome. Further, product and patient safety may rely on compliance with good manufacturing practices in terms of hygiene and hygienic practices, for example for containing and managing fluid aseptically during processing or sampling and for cleaning equipment and facility.

The application of cGMP (current Good Manufacturing Practices) and QMS (Quality Management Systems) is typically required to ensure adequate product quality through well controlled and auditable production conditions. cGMP processing environments are designed to conform to the guidelines recommended by agencies that control the authorization and licensing of the manufacture and sale of pharmaceutical products, such as for example the FDA (Food and Drug Administration). Regulatory and/or legal requirements for production of biopharmaceuticals, such as approval by the FDA, require rigorous control and documentation of set-up, installation, and use of equipment, for example with regard to operator interaction and automated process control. Batch records (BR), or electronic batch records (eBR), are fundamental in the production of biopharmaceuticals as well as for the approval and monitoring from regulatory bodies. Batch records manage, monitor and document procedures and results, and they typically refer to established standard protocols and standard operating procedures (SOPs) managed through QMS, which describe the operation, use, maintenance and documentation of subcomponents or steps, for example.

The drug development process generally is characterized by a ‘development funnel’ with a significantly larger number of drug candidates going through clinical trials than the number of successful and eventually approved drugs. Thus, the trend to an increasing number and variety of drug products and treatments that reach patients involves drastic increase in the number of clinical trials and the number of production runs to provide clinical trial material. The clinical trial material is typically manufactured under the same rigorous cGMP and QMS requirements as applied during the final, regular production of an approved drug. Thus, in the perspective of the healthcare sector being subjected to cost pressure, and the need to bring bringing new and improved treatments to patients faster and with lower, it is especially in the production of clinical phase material where improvements in biomanufacturing technology can be leveraged.

Continuous and connected processing regimes are nowadays becoming desired additions or alternatives to the traditional batch manufacturing methods traditionally applied in the biopharmaceutical industry, as they may provide advantages in terms of overall product and/or process quality, efficiency and throughput or cost. Continuous and connected processes involve higher complexity in manufacturing equipment design and automation, including process control and monitoring. Thus, additional and improved process monitoring and process analytical technologies (PAT) are desired, and currently developed and applied where appropriate.

Another need in biopharmaceutical manufacturing is the emerging distributed and local production of drug substances, and so called ‘in country for country’ production. Together with the increasing number of drug product, and trends to personalized medicines and distributed and local manufacturing, improvements in biopharmaceutical manufacturing technology are required that providing a more modular and flexible design and deployment of production capacity, facilities and equipment. A modular design allows for replication and expansion of production capacity, both inside a specific manufacturing site and facility but also across different production sites and countries. Further, there is a need for installing and deploying manufacturing technology quickly to meet specific production needs, without the overhead and financial risk of excessive capital expenditures and investments. Improved manufacturing technology should therefore enable a LEAN approach to biopharmaceutical production.

Another need in biopharmaceutical manufacturing is improved safety for patients, production personnel and the environment. Drug products should be free from contaminations and production technology should help to avoid the risk for product contamination, for example by microorganisms, product carry-over in between different drug production processes or other undesired contaminants that could adversely impact patient health or drug efficacy.

Protection of personnel running biopharmaceutical manufacturing processes is important when infectious, toxic or otherwise harmful substances are handled, for example in production of certain vaccines or antibody drug conjugates (ADC). Thus, there is a need for improved manufacturing technology that improves drug, patient and operator safety, for example by enabling closed processing and containment of processed fluids and substances.

One recent development addressing above mentioned needs to reduce production cost, increase production throughput and quality and to increase safety in biomanufacturing is represented by single-use technology (SUT), which is being rapidly adapted by the biopharma industry. With single-use processing technology and equipment, wetted parts that are in contact with the process fluid and drug product during processing, such as for example fluid storage vessels, tubing, separation equipment etc., are provided as clean and ready to use consumables which are to be installed and used for a specific process, product or over a limited time only and to be disposed thereafter.

SUT consumables are typically produced, configured and packaged in clean room environments to avoid contamination with microorganisms, particulates etc. SUT wetted parts can further be provided clean and pre-sterilized, thus allowing for aseptic and/or sterile processing, hereby reducing above mentioned risks relevant for product, operator or patient safety. Typically, SUT wetted parts are subjected to a sterilizing gramma irradiation treatment prior to use in the biomanufacturing process, and when doing so they are deployed as 'pre-sterilized' at the point of use. This may involve providing the consumable with a formal and validated sterile claim after the sterilizing treatment, however, it may involve alternatively to provide a consumable that has undergone a sterilizing treatment but is provided without a formal sterile claim. With controlled and rigorous manufacturing conditions, SUT consumables may also be deployed non-sterile and/or with treatments that controls the state and condition of the consumable. Hereby, contamination levels by microorganisms, generally called 'bioburden', or levels of contamination or presence of contaminating substances or particles may be controlled and maintained within predefined levels.

The advantage of using single-use technology (SUT) fluid handling equipment is primarily that cross-contamination in between production batches and campaigns is eliminated when the SUT equipment is used for a single drug product only. The SUT equipment is disposed of after use, which can be after a single run, batch or campaign comprising multiple runs and batches. When providing SUT equipment pre-sterilized or by other means bioburden controlled, initial cleaning and sanitization (for example by contacting the flow path with sodium hydroxide solutions) or sterilization can be avoided. This enables a LEAN manufacturing approach, because time consuming, costly and non-value adding steps can be omitted. When using the SUT for a single run or batch only, even cleaning post-use may be omitted. The elimination of cleaning procedures and required cleaning fluids further reduces clean water requirements to prepare cleaning solutions in the first place, fluid handling and waste treatment, which translates to reduced facility size and complexity.

Single-use equipment may be provided with fluid connectors that enable closed processing and thereby protect the process fluid line and/or the operator and environment from contamination or exposure to hazardous substances. Alternatively, fluid connectors may be providing aseptic connectivity features, hereby providing strict and complete closure of the fluid lines. When using aseptic connectors or disconnectors, sterility of a fluid line, two connected lines or components, or two disconnected lines or components can be maintained, provided that the fluid lines or components involved in the operation have been provided sterile. With these features, SUT equipment allows not only for more efficient processing, it may also allow for reducing requirements on classification and containment of facilities, thereby reducing cost and risk for contamination or infection of the process fluid and drug product, and/or contamination and infection of the process environment, facility or the operator.

SUT systems provide higher flexibility in (re-)configuring a manufacturing facility and adapting it to different processes and products by design, i.e. through the reduced need for fixed installations compared to traditional processing systems and installations, which for example required auxiliary systems for CIP and SIP. Nowadays, SUT equipment and SUT processing regimes are therefore available or are being made available for the majority of all types of equipment and/or unit operations, among them bioreactors for cell culture or fermentation, buffer bags for liquid storage, tubing and pumps for liquid transfer and filling operations, filters, chromatography columns and related systems for separations.

With these features, SUT equipment does provide improved efficiency, safety and convenience compared to traditional installations and systems. Traditional installations and systems for processing are typically made from stainless steel and/or plastic and are not produced under controlled (or clean room) conditions reducing bioburden. Traditional systems are typically cleaned in place (CIP), sometimes also sterilized in place (SIP), which not only requires auxiliary installations, equipment and fluids, but involves also substantial time for validation, execution, and quality control of CIP and SIP procedures. The size, cost and complexity of facilities relying on traditional equipment and installations is significantly larger compared to production facilities deploying SUT. SUT facilities and processes can be planned, built and started up in significantly shorter time compared to traditional manufacturing technology, and SUT reduces capital investments and financial risk associated with a typically highly dynamic portfolio of drug products as well as risk and uncertainty related to the testing and approval of drug candidates and their product demand.

While the biopharma industry is rapidly adopting SUT for many reasons, there is still a need to improve current SUT systems and installations further to further increase the efficiency and effectiveness of production biopharmaceutical manufacturing. These improvements needed relate to improved design as well as improved ways of using SUT systems.

SUMMARY

The adaption to single-use technology brings challenges that yet need to be overcome. Some challenges that need to be overcome are common to both traditional and SUT systems.

One challenge with the design of current systems, subsystems and components is a limited flexibility in achieving different process and system configurations, both at a system supplier and especially at the point of use in biopharmaceutical manufacturing. In general, systems are built or adapted for a specific processing task by a system supplier and then delivered to the end user for use limited to said specific task and application. Today, both traditional and SUT systems provide by design very limited capabilities of re-configurations performed at the point of use and thus by the user. Due to this lack of configurability, different and dedicated systems and products are generally required today for running different unit operation, such as running either a chromatography unit operation or a filtration unit operation. There is therefore a need for new systems, and in especially new SUT systems, providing higher flexibility and configurability at low cost and lead time, and in especially configurability at the point of use.

This has been achieved by means of a biological fluid processing system, comprising a fluid processing device comprising at least one fluid path, a pump for providing a pressure in the at least one fluid path, a valve arranged along said fluid path and a first actuator arranged to control the valve to assume a desired opening state of said fluid path. The biological fluid processing system comprises further a processing interface comprising a pump drive for driving the pump of the fluid processing device, and a processing control element comprising a pump control system arranged to control at least the pump drive and a valve control system arranged to control the first actuator. The system is modular. The fluid processing device is comprised in a fluid processing device module having a predetermined fluid processing device configuration. The processing interfaces are comprised in a processing interface module having a predetermined processing interface configuration. The processing control element is arranged to receive information relating to the predetermined processing interface configuration of the processing interface module, receive information relating to the predetermined fluid processing device configuration of the fluid processing device module and control the at least one pump drive and/or the valve based on the received information relating to the predetermined fluid processing device configuration and the predetermined processing interface configuration.

Accordingly, the processing control element is arranged to control a variety of system set-ups.

The modular design allows for an easy and robust (re-) configuration of a system to adapt to different unit operations, preferably at the point of use.

The solution according to the present disclosure enables designing a compact system. The occurrence of dead-volumes of the system may be minimized.

The fluid processing device may be pre-fabricated. Thus, the need for the user to connect hoses may therefore be reduced or even eliminated. The time for installation may therefore be decreased.

Further, as the processing control elements for different types of activities may be the same, if one processing control element is made unavailable, it may be substituted with another one, as the processing control elements may be generic.

Further, also when it comes to validation requirements, use of a generic processing control element is beneficial.

The physical separation of the processing control element from the fluid processing device allows for an increased flexibility in adapting to different system capacities, such as flow path IDs, flow rates or processing volumes. The separation of the fluid control element and the fluid processing device also allows for an increased flexibility in adapting to different unit operations such as chromatography with a single column (batch chromatography) or multiple columns, filtration etc.

This flexibility is particularly advantageous for bioprocessing where small production scenarios are projected for biologics and where more flexibility in facility and equipment will be a competitive advantage. Having a processing control element that can serve multiple unit operations and processes does help in reducing CAPEX requirements as the control elements can be utilized for different operations and processes, in contrast to today's technology where completely different systems need to be purchased. Other advantages are reduced complexity in servicing equipment, and reduced overall footprint in the facility.

For small production facilities, capital investment and the number of processing control elements may be reduced without compromising overall processing time and throughput. In fact, the same processing control element may be used for different types of processes. While the processing control element is used in a first process and unit operation with a first fluid processing device having a first fluid processing configuration, for example, a second fluid processing device having a second fluid processing configuration and being arranged for a second manufacturing process may already be in the process of setting up the fluid line(s) for processing and connecting devices to the second fluid processing device. The processing control element is then deployed after completion of the first manufacturing process and connected to the second fluid processing device for processing in accordance with the second fluid processing device configuration.

In different embodiments, the fluid processing device module is provided with own structural support.

The modularity of the system provides as discussed above for completely new LEAN ways of working and utilizing equipment in biomanufacturing. When the fluid processing device is provided with structural support that is not relying on structural support provided by the processing control element, the fluid processing device can be utilized in a biomanufacturing process for establishing fluid connections to external devices prior to pairing it with the processing control element for conducting automated processing. As an example, the assembly and configuration of fluid lines and thereby the setup of consumables in a SUT biomanufacturing system is a time consuming activity that needs to be performed prior to the automated processing. In order to complete this setup of the consumables, the fluid processing device needs to be connected and assembled with required external devices such as auxiliary fluid storage and/or fluid transfer equipment and/or separation devices. A new and improved way of deploying the system according to the invention is to connect the re-usable (and expensive) processing control element after the fluid line assembly and/or fluid connections with the fluid processing element and external devices, if any, have been completed or commenced. As a result, the processing control element is primarily used during the actual product processing and is not blocked up during assembly and preparation steps that do not generate value.

The same may apply for the processing interface, if provided as a separate modular unit and separated from the processing control element.

Preparation steps for a subsequent process step can be undertaken while the processing control element is employed in another process step, for example. The same benefit applies for disassembly and disposal of used wetted parts and consumables after the processing. As a result, the processing control element can be used with much greater flexibility in a process and facility and allows for a quicker changeover between process steps and processes.

In certain embodiments, the processing interface may be provided as a separate modular unit and connected after the fluid line assembly and/or fluid connections with the fluid processing element and external devices, if any, have been completed or commenced. Hereby, also the processing interface may be utilized with much greater flexibility and LEAN efficiency in a process and facility as the processing interface is not blocked up during assembly and preparation steps that do not generate value.

With SUT systems, challenges arise from the frequent change and replacement of materials, i.e. SUT consumables, compared to traditional manufacturing employing traditional systems. In one aspect, this creates challenges for warehouse space required to store consumables at the biomanufacturer's facility. In another aspect, packaging and labelling of SUT consumables needs to compatible with hygienic storage and transport requirements. For example, conventional cardboard boxes are prone to host mould and/or spores and are therefore not suitable for storage. Further, they are strictly excluded for further material transfer inside a biomanufacturing facility. The fluid processing device module provided with own structural support allows for improved (re-)packaging, labelling and handling such that the fluid processing device can be stored, transported and eventually deployed at a biomanufacturer in a safe and robust fashion.

Today, the frequent change associated with SUT consumables requires that new (fresh) installations of the processing fluid lines are to be used, installed, qualified and documented for each production run, batch or campaign. This implies a large number of articles and an extended bill of material (BOM) to be handled at the point of use in the bio-manufacturing suite. It also requires higher material flow and material handling in the complete including managing, documenting and qualifying said material. During the actual processing, this requires a highly intensified and time-consuming handling of material by operators, which involves potential errors, deviations and delays that in the worst case may affect the overall quality and efficiency of manufacturing. The increase in the number of operational steps and operator interactions arising with this extended BOM is reflected by an extended batch protocol and higher complexity in the work instructions manifested in manufacturing batch protocols and records compared to traditional manufacturing. Thus, the system above allows for reducing the complexity in material flow, BOM, work instructions, batch records.

The modular biological fluid processing system can operate a fluid processing device, FPD, designed for "traditional" cleaning and (re-)use. The modular system concept may thereby provide standardisation for a "one fits all" system platform where the modules are designed according to its intended use for either single or multiple cycles, batches, campaigns and/or processes.

The modularity of the system concept according to the invention further allows for using a fluid processing device, FPD, and removing it from the system and processing control element, PCE, for example for performing maintenance of the processing control element, or cleaning and sterilizing the fluid processing device. These activities can be performed elsewhere, as for example in another room, facility or at another site, company or at a supplier. The removed fluid processing device can be re-used after maintenance, cleaning or sterilization, together with the same or with a different processing control element. Hereby, the system concept according to the invention allows for improved deployment and use of traditional and hybrid systems, too.

In a further application scenario, a structurally self-sufficient fluid processing device (consumable) can be stored in between campaigns, which allows for new use cases if the design and material selection for the consumable supports longer-term use. This storage is especially of interest for SUT processing and in order to avoid the risk of cross-contamination in between different processes. By being able to separate the fluid processing device from the processing control element, and optionally from the processing interface, a fluid processing device may be stored in between production campaigns, potentially together with a fluid treatment device such as a column or a filter, while the processing control element and/or processing interface can meanwhile be utilized in other processes.

In a further application, a processing control element and/or processing interface may be removed from a fluid line assembly including the fluid processing device after processing, for example for keeping the fluid line assembly intact and ready for a future process and batch, while the processing control element and/or processing interface may be utilized meanwhile in a different process and batch, and maybe in another part of the facility or factory. This alternative may be attractive when running equipment in traditional fashion including the cleaning, intermediate storage and re-use of fluid processing equipment and wetted parts.

In a further application, the system and the processing control element may be utilized in a continuous processing operation. Continuous processing generally refers to operations that span over longer time spans than a typical batch process. They are typically designed such that no or very limited fluid hold volumes in between two adjacent and connected operational steps occur, for example two adjacent and connected unit operations such a bioreactor with a filtration or chromatography step processing the output of the bioreactor. For operation in a continuous process, the FPD may be adapted specifically for the process and in a different manner compared to a batch process. A chromatography step and the FPD may for example be designed to operate alternating with two columns, where the first column is loaded by applying the feed supplied to the system, while the second column is eluted and thereafter regenerated for a new loading step, and the second column is loaded thereafter while the first column is being eluted and thereafter regenerated for a new cycle. The continuous chromatography system and its FPD may also be adapted to run 2, 3, 4 or more columns to accommodate a continuous processing, where two or more of said columns typically are connected in series over a certain time period within the column loading step, which may allow for a higher capacity utilization of the columns and thus higher productivity. Ideally, the modular processing control element and/or processing interface unit of the base system can accommodate a wide range of different FPD variants to allow for flexibility in continuous operations and different configurations of FPDs and connected external components and external fluid treatment devices.

In one embodiment, the modular system is adapted to allow for operation of two or more unit operations, either in batch or continuous fashion and either in a traditional way of use or a SUT way of use, and the processing control element may allow for interfacing two or more processing interface and fluid processing device modules.

In another embodiment, the modular system and its processing control element may be extended with components internal or external to the processing control element, for example modules allowing for an increase in the number or type of valves, pumps or sensors. In another embodiment, the modular system and its processing interface may be extended with components internal or external to the processing interface, for example modules allowing for an increase in the number or type of interfaces to valves, pumps or sensors.

The present disclosure further relates to a processing control element for use in a biological fluid processing system as disclosed herein.

The present disclosure further relates to a fluid processing device for use in a biological fluid processing system as disclosed herein.

The present disclosure further relates to a method for setting up a biological fluid processing system. The method comprises a step of providing a fluid processing device comprising at least one fluid path, a pump for providing a pressure in the at least one fluid path, a valve arranged along said fluid path and a first actuator arranged to control the valve to assume a desired opening state of said fluid path. The method further comprises steps of providing a processing control element, connecting the fluid processing device to the processing control element, and controlling at least one pump drive for control of the pump and/or the valve based on received information relating to a predetermined fluid processing device configuration and a predetermined processing interface configuration.

DETAILED DESCRIPTION

Figure 1A:
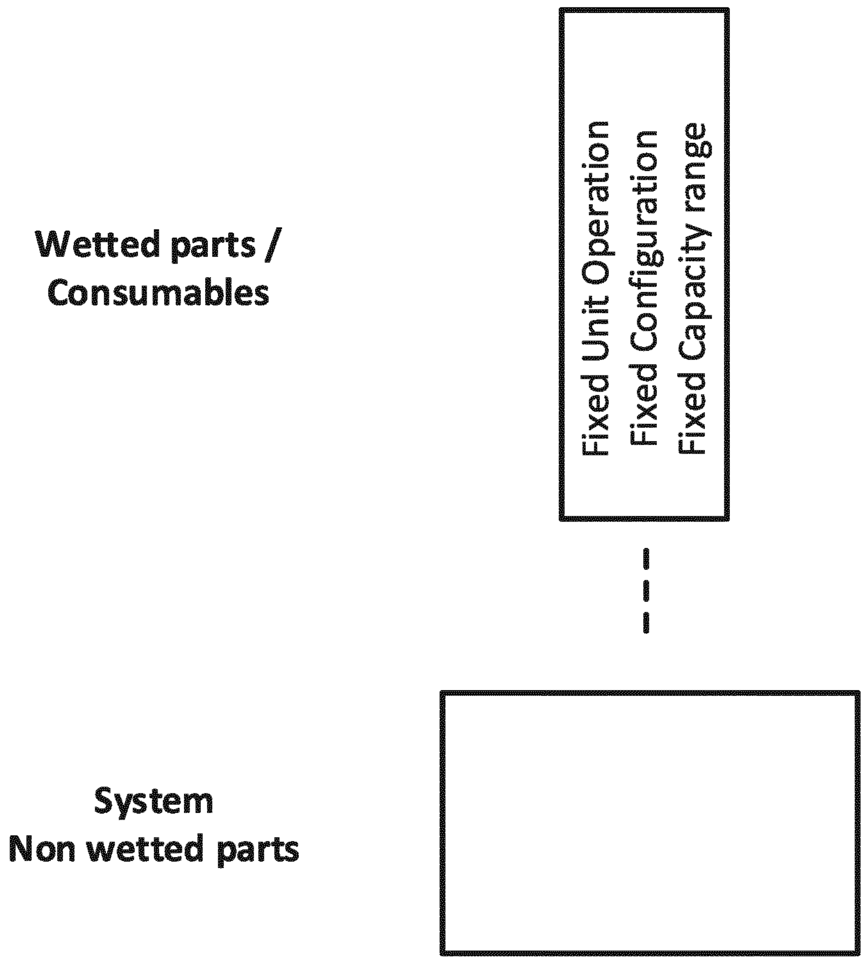
FIG. 1a (Prior Art)
FIGS. 1*a* and 1*b* illustrate schematically examples of a prior art designs of a biological fluid processing system.
Figure 1B:
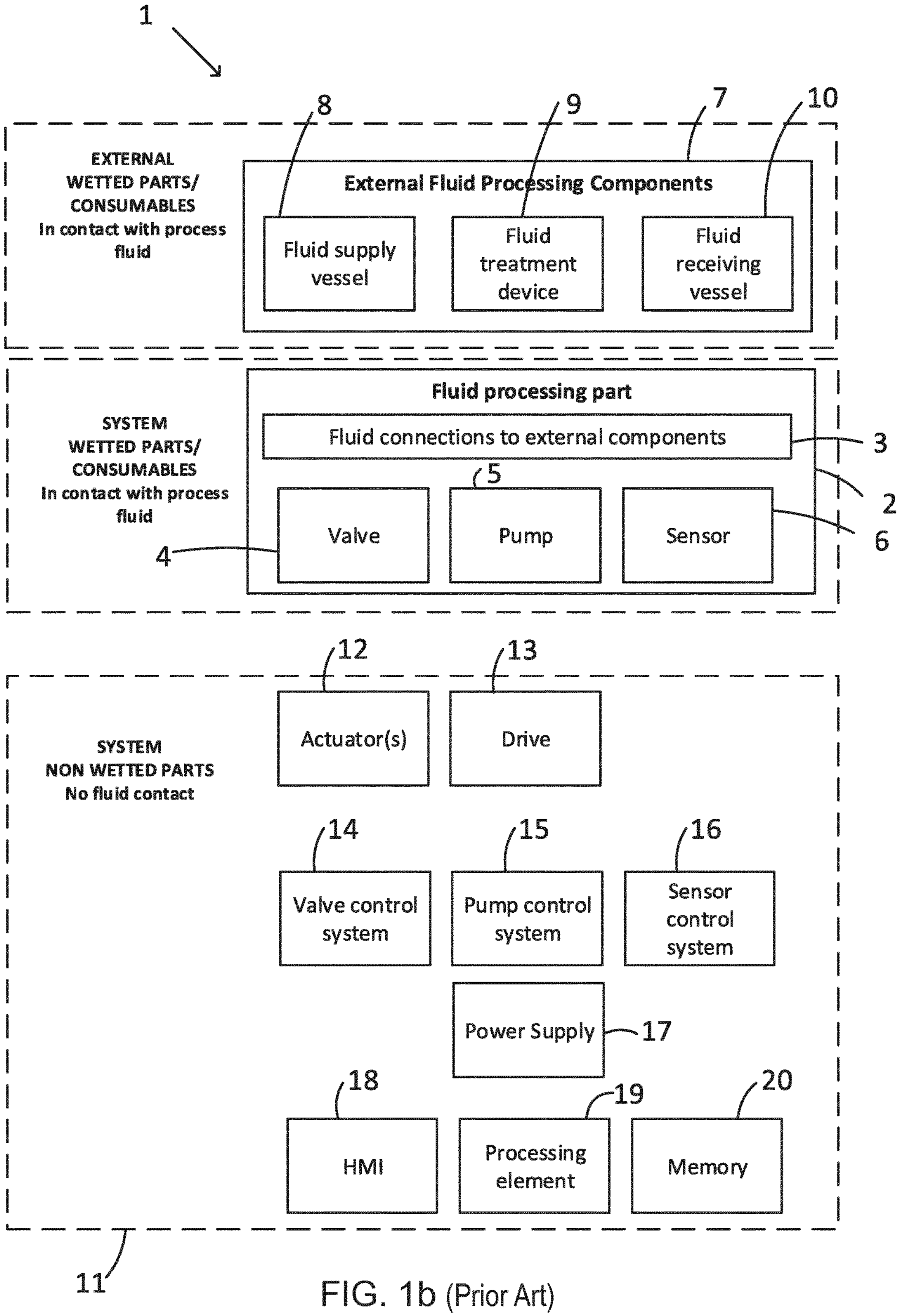
FIG. 1b (Prior Art)

In FIGS. 1*a* and 1*b* a prior art fluid processing system 1 is illustrated.

The fluid processing system 1 comprises a fluid processing part 2. The fluid processing part 2 comprises characteristically wetted parts, i.e. parts in contact with process fluid. The wetted parts comprises system wetted parts and/or consumables. In the illustrated example, the fluid processing part 2 comprises fluid connections 3 to external fluid processing components and possible other external components. The fluid processing part comprises further in the illustrated example at least one valve 4, at least one pump 5 and at least one sensor 6.

The fluid processing system 1 comprises further external fluid processing components 7. The external fluid processing components 7 comprises external wetted parts/consumables arranged to be in contact with process fluid. In the illustrated example, the external fluid components 7 comprise a fluid supply vessel 8 and/or a fluid treatment device 9 and/or a fluid receiving vessel 10.

The fluid processing system 1 comprises further system non-wetted parts 11. The system non-wetted parts comprise the parts 11 of the fluid processing system 1, which are not in fluid contact. The system non-wetted parts 11 comprise for example processing interfaces such as actuator(s) 12 and/or drive(s) 13. The system non-wetted parts 11 comprise further processing control elements. The processing control elements comprises for example a valve control system 14 and/or a pump control system 15 and/or a sensor control system 16. The processing control elements may further comprise a power supply 17. The system non-wetted parts comprises further Human-Machine Interface(s), HMI(s) 18, a processing element 19 and a memory 20.

The present invention addresses prior art processing systems for example as discussed in relation to FIGS. 1*a* and *b*. The present invention further addresses related processes and workflows.

Further, the present invention addresses SUT processing systems traditional systems and/or hybrid systems, where hybrid systems are characterized by a mix and/or combination between SUT and traditional systems, subsystems or components.

Figure 2:
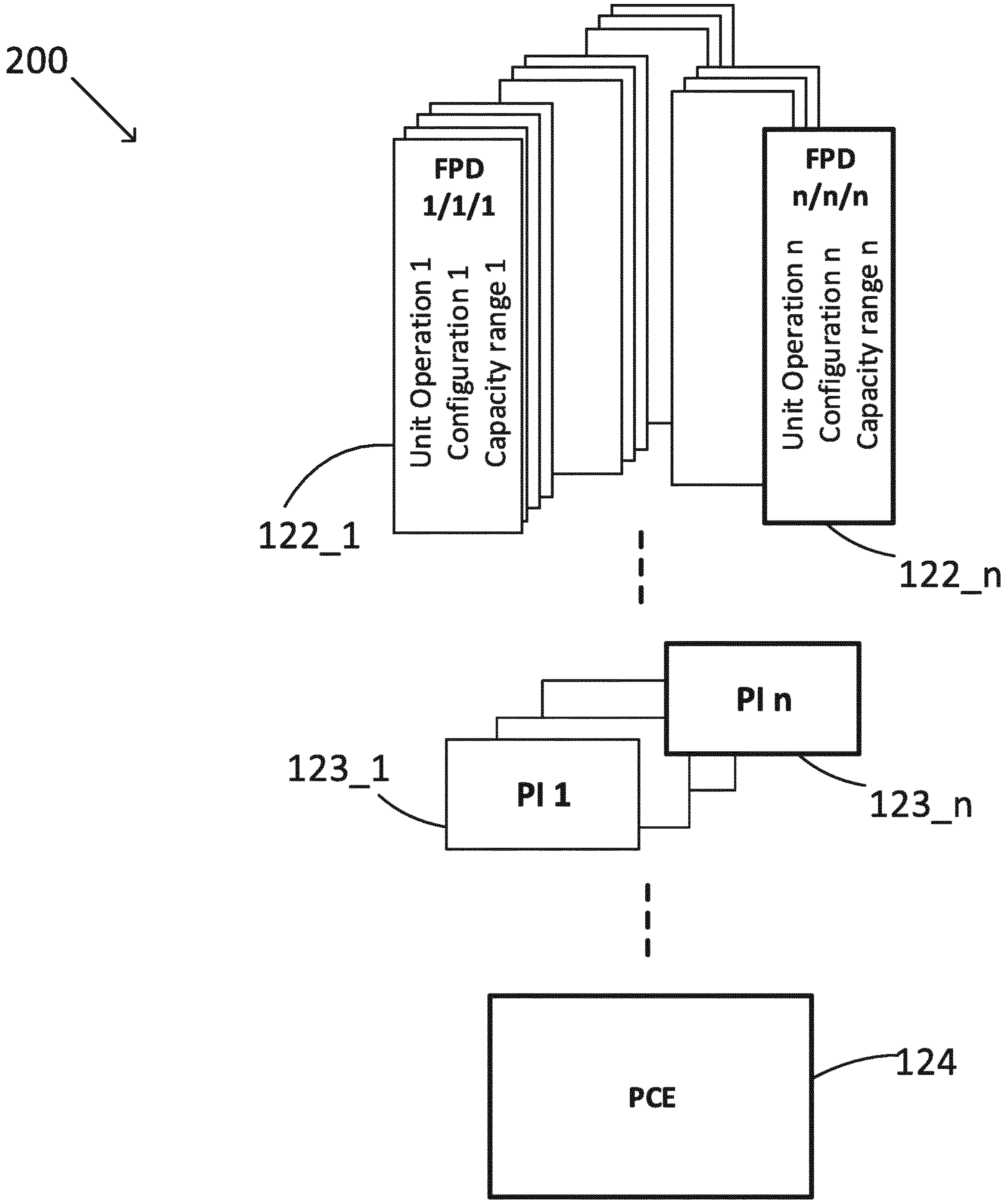
FIG. 2 illustrates schematically an example of a modular fluid processing system according to the invention.

FIG. 2 discloses an example of a modular biological fluid processing system 200. The modular biological fluid processing system 200 may comprise all or some of the parts as will be discussed in relation to FIG. 3.

The biological fluid processing system may for example be a SUT biological fluid processing system. However, the biological fluid processing system may also be a traditional biological fluid processing system or a hybrid biological fluid processing system.

The modular biological fluid processing system 200 is designed with preferably three modules where a common processing control element 124 may be paired with one or multiple processing interfaces 123_1, . . . , **123_*n* which have at least two different processing interface configurations to operate a variety of fluid processing devices 122_1 . . . , 122_*n*, wherein the fluid processing devices 122, or modules comprised by the fluid processing devices 122** may differ in unit operation and/or configuration (P&ID)

and/or capacity/size, such as for example flow rate range, tubing and component sizing, liquid holdup volume, pressure rating etc.

The SUT fluid processing system may for example be a SUT chromatography system built for process scale-up and production in early clinical phases. The exemplified system is intended to be used with ready-to-use, disposable fluid processing devices 122_1, . . . 122_n that are deployed as consumables and disposed after processing.

The fluid processing devices 122_1, . . . , 122_n may be structurally self-sufficient flow path systems. The structurally self-sufficient fluid processing device may be provided as a cabinet. The cabinet may be arranged to contain fluid from a potential leakage within the fluid processing device inside the cabinet.

The structurally self-sufficient fluid processing devices 122_1, . . . , 122_n may have different fluid processing device configurations for example with regard to capabilities and unit operations. The fluid processing devices 122_1, . . . , 122_n may further comprise a fluid treatment device, such as a column, a filter, a reactor etc. The fluid processing devices may further comprise a device for fluid storage and/or one transfer device such as a hose.

The processing interfaces 123_1, . . . 123_n provides for physical and/or mechanical interfaces required by the fluid processing devices 122_1, . . . , 122_n. As is clear from the above different fluid processing devices may require physical and/or mechanical interfaces that are different with regard to position, size, number etc.

The respective processing interface 123_1, . . . , 123_n typically comprises at least one pump drive, such as for example a motor with a rotating shaft, where the rotating shaft is coupled to a pump chamber in the fluid processing device, hereby engaging the pump chamber and allowing pumping of fluid. In some configurations of the fluid processing device, a single pump may be sufficient, however, the size and capacity of the pump and thereby the size of pump drive needed in the processing interface may be different. In other embodiments of fluid processing devices, the location or the number of interfaces in between pump drives and pump chambers of the fluid processing devices may vary. Hence, the modular system allows to deploy different, possibly dedicated, processing interface modules for utilization of different fluid processing devices together with a processing control element 124. Alternatively, the modular biological fluid processing system 200 may be built with at least one single processing interface module, however, this module allowing for re-configuring said processing interface for utilization together with different fluid processing devices together with the processing control element. For example, pump drives may be replaced with drives of higher or lower capacity and size, or pump drives may be added, removed or re-arranged to match different requirements of different fluid processing devices.

The modular biological fluid processing system 200 has electrical connections between components of the fluid processing device, such for example sensors, and the processing control element 124. The electrical connections may be established directly in between the fluid processing device and the processing control element. However, the electrical connections may also or instead be established via the processing interface. In accordance with the latter example, the processing interface comprises also electrical connections. The latter example may be of advantage, as cables to be connected with the fluid processing device can be kept short. Alternatively, cables may be omitted by interfacing and establishing electrical contacts in between the fluid processing device and the processing interface when docking the fluid processing device to the processing interface.

The modular biological fluid processing system 200 may further have pneumatic connections between components of the fluid processing device, such for example valves and their first actuators, and the processing control element. Pneumatic connections may be established directly between the fluid processing device and the processing control element. Pneumatic connections may instead or in addition thereto be established via the processing interface. The latter may be of advantage as pneumatic lines (pneumatic tubing) to be connected with the fluid processing device may be kept short. Alternatively, pneumatic lines (pneumatic tubing) may be omitted by interfacing and establishing pneumatic contacts in between fluid processing device and processing interface when docking the fluid processing device to the processing interface.

The use of multi-connectors may be preferred, for example for combining electrical and/or pneumatic connections on one or more connectors, to reduce the number of user interactions and connections to be made when connecting the processing control element, processing interface and fluid processing device. Multi-connectors may also help in fool-proofing user interactions as the layout of the multi-connector is pre-defined.

Further, the assignment and purpose of individual connections or connection points on multi-connectors may be changed when connecting different fluid processing devices and/or processing interfaces with the processing control element. This allows for high flexibility in modifying the fluid processing devices and processing interfaces, for example for future upgrades of fluid processing devices or for customization of fluid processing devices with new and/or different components. General purpose I/O-interfaces with their connections for transmitting generic signals used for control and/or monitoring of electrical or pneumatic components may be provided. The general purpose I/O-interfaces may be utilized differently between different combinations of processing control element, processing interfaces and fluid processing devices. Also, an excess of connections for such generic signals may be provided on the connection interfaces and/or multi-connectors within the fluid processing device and/or processing interface and/or processing control element, such that all available I/O connections and interfacing capabilities are not used at all in certain configurations. Thus, the connections between the fluid processing device and/or processing interface and/or processing control element may be implemented by the use of multi-connectors, generic I/O interfaces, wherein the connections are re-configured by alteration of their functional assignments when connecting different fluid processing devices and processing interfaces to the processing control element.

By means of the modular design of the processing control element, processing interface(s) and fluid processing device(s) and possibly the use of generic connectors, a wide variety of different fluid processing devices can be utilized together with the processing control element 124, for example different fluid processing devices configured for different unit operations such as chromatography or filtration. In this regard, flexibility is provided to adapt to different fluid processing tasks by replacement of the fluid processing device 122

In another aspect, flexibility is provided in making a system and its processing control element 124 'future-proof', as the generic connectors allow for the addition of new fluid processing device and processing interface configurations and their use with the generic processing control element 124 without a need for physically upgrading or modifying the processing control element 124. Instead, functionality (and connections) may be re-assigned by firmware updates or by deploying different software configurations.

Further, by means of the modular design and possibly the connection of the submodules via generic connectors, the modular biological fluid processing system 200 may be used with different types of fluid processing devices that differ in their use case, such for example a traditional way of using biological processing systems or a SUT way of using biological processing systems. For example, the processing control element 124, and the processing interface configured for a chromatography unit operation and a corresponding fluid processing device, may be used with a SUT fluid processing device in one manufacturing setup or facility, while an equivalent fluid processing device and processing interface, and alternatively the same fluid processing element and the same processing interface may be utilized in another manufacturing instance with a similar fluid processing device but in a traditional setup including the cleaning of the fluid processing device prior and/or after processing and thereby allowing for a re-use of the fluid processing device. Hereby, the modular design and the connections via generic connectors allows for a 'one fits all' system platform that enables different use cases for a system by allowing the adaption to different fluid processing devices provided for different use cases. One fluid processing device provided for traditional use may for example comprise a pump module or other components in the flow path that provide longer operation and lifetime compared to a SUT fluid processing device and its flow path. A fluid processing device provided for traditional use may comprise different wetted materials compatible with harsh and extended cleaning fluids and regimes, and it may provide other types of fluid connectors and inlets and outlets.

For the end user, the modular design of the modular biological fluid processing system 200 and the connections via generic connectors allows thereby for flexibility in changing operating regimes on demand, for example from traditional bioprocessing to SUT bioprocessing or vice versa. Thereby, the need for investing in multiple and different systems and products is omitted, which reduces not only capital expenditures but also reduces service and maintenance complexity, footprint in the manufacturing facility etc.

Thus, the modular biological fluid processing system 200 is in one example a single-use technology (SUT) system. A SUT system is characterized primarily by the way and purpose in which wetted parts are being used. With a SUT system, the wetted parts are used exclusively for production of a specific biologic product or a specific product class. The SUT wetted parts may be replaced after a certain time, for example after completion of a production batch, a campaign or on basis of other requirements. The replacement of used SUT wetted parts typically leads to the disposal of these parts, which is why SUT is often described as disposable technology and SUT wetted parts are described as disposables.

With the replacement and installation of new SUT wetted parts, the status of the installed wetted parts are known in terms of hygiene and contamination levels and/or wetted part functionality. For example, a pre-sterilized and clean wetted part may be installed. After replacement of the SUT wetted parts, additional production batches and/or campaigns with the same or a different biologic product may be run using the newly installed wetted parts. The design of a SUT system including its wetted parts shall preferably facilitate the easy replacement of its wetted parts.

The modular biological fluid processing system 200 is as discussed above in one example a traditional system. The traditional system is characterized primarily by the way and purpose in which the system and its wetted parts are used. With traditional systems, the wetted parts are typically not replaced in between production runs with different biologic drugs or different biologic drug classes. Instead, extensive and thorough cleaning is pursued to avoid cross-contamination, carry-over in between batches of different drugs. Naturally, one may use a traditional system exclusively for production of a dedicated drug product, for example in regular production, and thereby the risk for cross-contamination and carry over between different drug products is eliminated.

When producing material for clinical trials of drug products where small quantities of many and different drug products need to be produced, the cleaning of the wetted parts is required though, involving tedious cleaning methods, cleaning validation and QC after cleaning steps.

The design of a traditional system including its wetted parts is typically not facilitating an easy replacement of its wetted parts.

The fluid processing system 200 is in one example a hybrid system. The hybrid system is characterized by a mix of system components or rather subsystems where at least one subsystem is characterized and used as SUT subsystem, and at least another subsystem is characterized and used as traditional system. Hybrid systems may be used in case that technology to build a full SUT system are not available, for example. A hybrid system may be useful in cases where a subsystem difficult to clean can be deployed as SUT subsystem, while other easy to clean subsystems may be of traditional type. An example for a hybrid system is a chromatography unit operation comprising a chromatography system with SUT wetted parts, connected to SUT fluid supply and fluid receiving vessels and bags, however with a traditional chromatography column as a fluid processing device. While all wetted parts except the column may be deployed as SUT consumables, which may be pre-sterilized, the column may be cleaned after conventional column packing operations because the combination of a specific chromatography resin and specific column and packed bed dimensions are not available in form of a SUT column. While the example of the conventional chromatography column describes an external fluid processing component, there may be certain components or modules of the fluid processing device that are not available in SUT technology or where available SUT components do not provide required capabilities of traditional technology, such as for example a specific sensor required. Thus, traditional technology may be combined with SUT for a hybrid-processing device and system.

Figure 3:
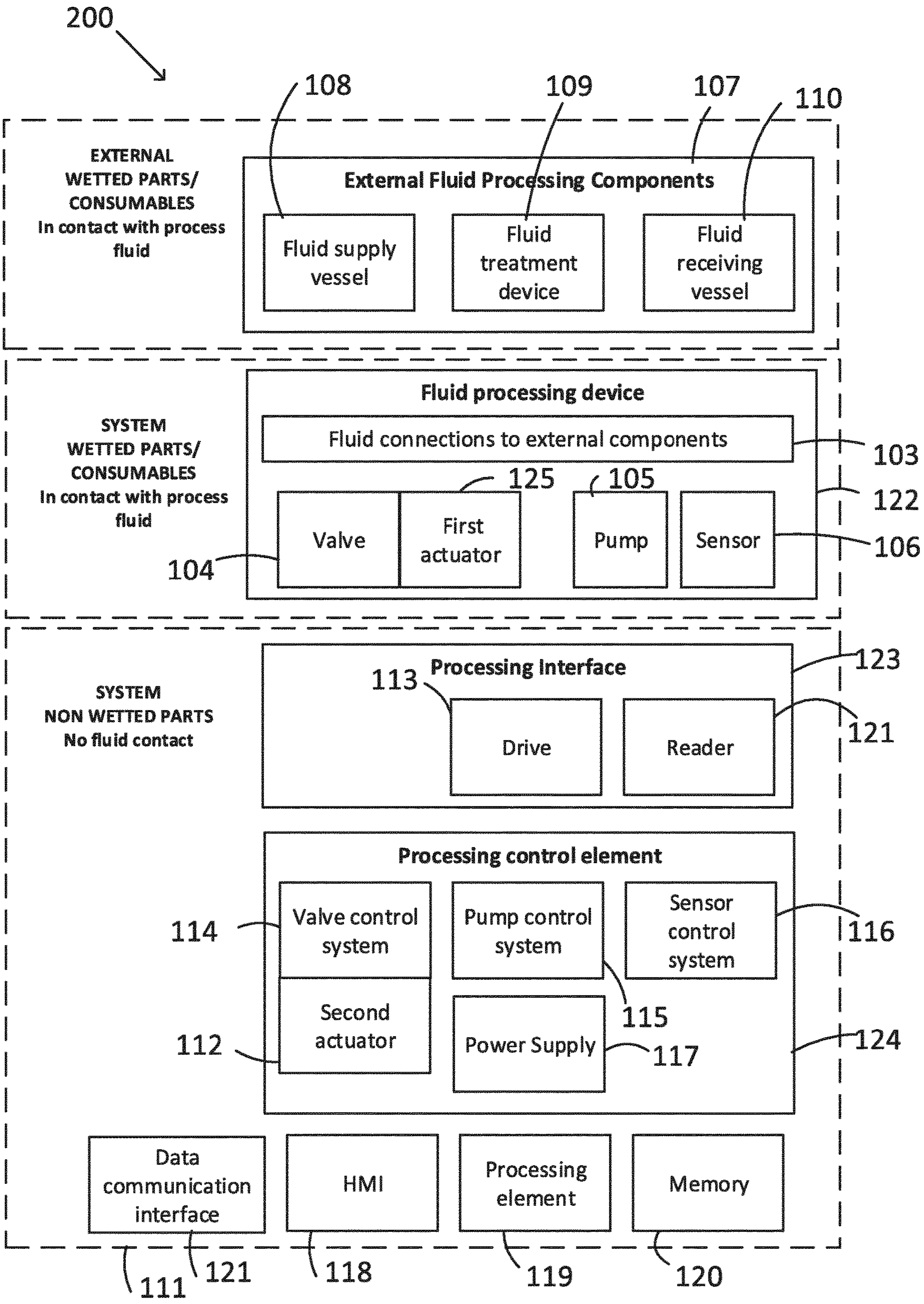
FIG. 3 is a block scheme schematically illustrating the modular design of the fluid biological fluid processing system of FIG. 2.

In FIG. 3, an example of a fluid processing system 200 designed by modularity is illustrated.

The fluid processing system comprises a fluid processing device, FPD, 122 comprising wetted parts in contact with the process fluid, a processing interface, PI, 123 and a processing control element PCE, 124. In one example, the processing control element 124 can operate at least two different types of fluid processing devices 122 or fluid processing devices of different design, preferably one at a time. Some aspects of the modular biological fluid processing system 200 were discussed in relation to FIG. 2.

The fluid processing device 122 comprises, as stated above, characteristically wetted parts, i.e. parts in contact with process fluid. The wetted parts comprise system wetted parts and/or consumables.

The fluid processing device 122 comprises at least one fluid path. The at least one fluid path may comprise a fluid conduit (not shown) arrangement having at least one inlet and one outlet. The fluid processing device 122 may comprise fluid connections 103 arranged to connect the fluid conduit (not shown) arrangement to external fluid processing components. The fluid processing arrangement may be formed in a fluid processing core.

The fluid processing device 122, or fluid processing core, comprises at least one valve 104 controlled by a corresponding first actuator 125, wherein the valve/actuator arrangement is arranged to control the flow in said at least one fluid path. The valve is arranged said fluid path and the first actuator is arranged to control the valve to assume a desired opening state of said fluid path.

The fluid processing device 122 comprises further at least one pump 105 arranged to control the flow in said at least one fluid path. The fluid processing device 122 comprises further at least one sensor 106 arranged to monitor at least one state of the process fluid of the fluid processing device 122.

The at least one valve 104 with corresponding first actuator 125, the at least one pump 105 and the at least one sensor 106 are operatively connected to the processing control element 124 via the processing interface 121 or via direct connection.

The fluid processing device 122 is designed as a replaceable flow path. The fluid processing device 122 may form a cabinet providing sufficient structural support for said mounting and/or assembly with said components that supply, transfer, process and/or receive the processing fluid. This structural support of said cabinet can be achieved either by the structure of the fluid processing device itself or by providing a supporting structure to the fluid processing device or parts of it. Thereby sufficient structural support is provided to allow for connection of external devices without the fluid processing device being connected to the processing control element 124.

In order to build a unit operation for a manufacturing step, it is typically required to connect the fluid processing device 122 to external fluid processing components 107. The external fluid processing components 107 comprise external wetted parts/consumables arranged to be in contact with process fluid. The external fluid processing components 107 comprise for example at least one fluid supplying vessel 108 and/or at least one fluid receiving vessel 110, and/or a fluid treatment device 109, which fluid treatment device 109 may for example be a chromatography column or a filter.

The modular biological fluid processing system 200 comprises further system non-wetted parts 111. The system non-wetted parts comprises the parts 111 of the fluid processing system 100, which are not in fluid contact. The system non-wetted parts 110 comprise the processing interface 123 and the processing control element 124.

The processing control element 124 comprises for example a valve control system 114 comprising a second actuator 112 and/or a pump control system 115 and/or a system 116 for monitoring and/or controlling said at least one sensor of the fluid processing device and/or other sensors of the system 200. The processing control element 124 may further comprise a power supply 117.

The valve control system 114 is arranged for controlling the at least one first actuator 125 and associated valve 104 in the fluid processing device 122.

The valve control system 114 is for example pneumatically controlled. The valve control system 114 is in one example arranged to control a fluid pressure (liquid or gas) to actuate the valve position of the valve in between fully open and fully closed. The valve control system may be arranged to control the fluid pressure to control the valve to intermediate closing and opening positions. Thereby, valve(s) may function as ON/OFF valves and/or pressure control valves. Pressure or flow control valves are controlled to restrict fluid pressure or fluid flow of the process fluid by a partial closure of the valve in between the fully open and the fully closed state of the valve.

The valve control system 114 comprises in the illustrated example second actuators. The second actuators may comprise electromagnetic valves or motor driven valves to modulate for example for a pneumatic pressure inside pneumatic conduits connected to the first actuator and associated valve.

One or a plurality of connector units (not shown) may be provided to allow for the connection and disconnection of a plurality of pneumatic conduits in the valve control system thereby connecting and disconnecting second actuators with first actuators. The connector unit(s) may for example be arranged at the fluid processing device and/or connect the processing control element to the fluid processing device and/or connect the processing control element to the fluid processing device via the processing interface.

In one example, the valve(s) 104 of the fluid processing device 122 comprise diaphragm valve(s). Pneumatic connectivity provide a convenient and flexible way of interfacing the cost-efficient diaphragm valves and their first actuators 125 in the fluid processing device 122 with their second actuators and pneumatic valve control in the processing control element 124. Alternatively, the diaphragm valve(s) and corresponding first actuator 125 are controlled by the second actuator(s) 112 and mechanical or hydraulic or electric control in the processing control element 124.

The pump control system 115 is arranged to control the at least one pump 105 in the fluid processing device 122. The system 116 for monitoring and/or controlling a sensor 106 is arranged to monitor/control the at least one sensor in the fluid processing device and/or potentially other sensors of the system.

To allow for a flexible and modular design of the processing control element, PCE, 124 and the fluid processing device, FPD, 122 but also a user-friendly interaction, the number of mechanical contact points between the processing control element 124 and the fluid processing device, FPD, 122 maybe minimized.

The mechanical interfaces for the fluid processing element 122 comprises an interface to a pump driver 113 and probably interfaces between re-usable readers 121 for sensors. The pump driver 113 is typically arranged to drive 1-3 pumps. The reader(s) 121 may comprise at least one flow meter transmitter to be positioned adjacent to a fluid path and adapted to mate with the transmitter, for example a magnetic flow measurement device, or a UV light source to be mated with and to be positioned adjacent to a UV cell in the fluid path. These interfaces are preferably comprised in the processing interface 123.

The pump drive(s) 113 may be standalone units that are fitted into the processing interface, PI, 123. The processing interface, PI, 123 may be provided with configuration slots to vary the physical position of pump drives or to accommodate different pump drives of different size or number, for example. In another embodiment, the processing interface 123 may be modular and comprise several process interfaces or a process interface and a separate component, for example a mobile and standalone skid comprising one or several pump drives. A separate pump drive 113 or a pump drive in a separate processing interface may be required when providing for large scale, high capacity, systems. For such systems, the processing interfaces (alt. the pump drives) may be provided as floor standing skids, preferably mobile on wheels. For small scale, small capacity, systems however, the processing interface(s) may be compact and lightweight such that they can be positioned on a bench, for example. The fluid processing device may be positioned on a bench, too.

There are electrical and/or fluid connection(s) between the processing control element 124 and the pump drive(s). These connections may be established via the processing interface 123. Alternatively, these connections may be established directly between the processing control element 123 and pump drive(s).

The processing interface typically comprises, as discussed above pump drive(s) 113. The pump drive(s) may for example comprise a motor with a rotating shaft, where the rotating shaft is coupled to a pump chamber in the fluid processing device, thereby engaging the pump chamber and allowing pumping of fluid.

The processing control element 124 has the capability of being adaptable and configurable for different processing interface 123 configurations and/or different fluid processing device 122 configurations. For example, the processing control element 124 may be configured in one configuration yielding a chromatography system with a fluid processing device 122 comprising the flow path, functions and components of a chromatography system, and may be configured in another configuration yielding a filtration system with a fluid processing device 122 comprising the flow path, functions and components of a filtration system.

For example, the second valve actuator in the processing control element 124 may be able to address at least two different or similar first actuators. The at least two different or similar first actuators may be arranged in at least two different fluid processing devices, wherein the second actuator may be arranged to address them both, one at a time.

The sensor(s) and/or valve(s) and/or pump(s) of the fluid processing device 122 may be in electrical communication with the processing control element 124. The communication may be performed wirelessly, or at least partly by wire, either directly or via the processing interface.

The system biological fluid processing system 200 allows to operate at least one out of multiple fluid processing devices that are different in regard to the unit operation provided (e.g. batch chromatography, multicolumn chromatography, filtration etc.), different in the specific instrument configuration (P&ID) provided (e.g. number and position of inlets/outlet, number of pumps and sensors etc.), and/or different in regard to capacity range (e.g. flow rates, volumes, pressure rating). To accommodate operation of one out of the multiple fluid processing devices, the processing interface is exchangeable, configurable or re-configurable to adapt said fluid processing device to the processing control element.

In one configuration for a chromatography system, for example, the fluid processing device may be configured with a specific number of inlets where said inlets shall be connected to external fluid supply vessels or SU bags, for example 6 inlets. The fluid processing device and its flow path may further be configured with connections to at least one fluid treatment device, which may for example be a chromatography column or a membrane adsorber for accommodating a separation task where solutes of the inlet fluid are adsorbed to the column. The fluid processing device with its flow path may further be configured with a specific number of outlet conduits and connections for connecting to fluid receiving vessels or single use bags, for example 4 outlets. In other configurations of the fluid processing device, a different number of inlets and outlet may be deployed, other fluid treatment devices may be connected, such as a filter in a filtration process. In other configurations of the fluid processing device, a fluid treatment device may be omitted or is not required, for example if the fluid processing device is aimed for fluid transfer from fluid supplying to fluid receiving vessels only.

External fluid processing components to be connected to the fluid processing device, such as fluid supplying or fluid receiving conduits or vessels and/or a separation or reaction devices, for example filters or a chromatography column, may be mounted to and/or assembled with the fluid processing device prior to connecting the fluid processing device with the process interface and/or the processing control element.

Further, the fluid processing device(s), processing interface(s) and/or processing control element may themselves also be formed by a plurality of sub-modules.

The system non-wetted parts 111 may comprise further Human-Machine Interface(s), HMI(s) 118.

Control parts of the processing control element implemented in software are comprised in a processing element 119 and a memory 120.

In detail, the processing control element is arranged to receive information regarding the predetermined processing interface configuration of the processing interface module and/or the predetermined fluid processing device configuration of the fluid processing device module. The processing control element is arranged to control the at least one of pump drive(s) and/or the valve(s) based on the received information relating to the predetermined fluid processing device configuration and/or the predetermined processing interface configuration.

The processing control element may comprise or be connected to a user interface for input of information relating to the predetermined fluid processing device configuration and/or the predetermined processing interface configuration.

The processing control element may comprise or be connected to a receiver arranged to receive information relating to the predetermined fluid processing device configuration and/or the predetermined processing interface configuration, wherein the received information may be communicated from for example an RFID tag associated to the processing interface module and/or fluid processing device module.

Different techniques for storing, accessing and/or communicating information on and/or between the modules of the fluid processing system 200, the system itself, and/or external monitoring and/or control system, such for example manufacturing executions systems or systems for factory, scheduling, workflow or material flow, may be deployed. Examples for such technologies are Machine Vision, which may be enhanced by machine learning and/or artificial intelligence, and a range of augmented and/or mixed reality operator guidance tools including light guide technologies. Other examples for tagging and sensing technologies that may be used are bar codes, QR codes, Ladar, etc.

In different examples, information about the configuration of the fluid processing device and/or processing element, when identified may be obtained from a database or the like. The identification may for example be obtained by a sensor such as at least one of those exemplified above. The information about the configuration of the fluid processing device and/or processing element may comprise information about the modules of the system, material flow, local scheduling and/or data from the manufacturer.

In the illustrated example, the receiver is comprised in a data communication interface 121.

The received information may comprise comprises the identity of the fluid processing device module and/or the identity of the processing interface module.

Figure 4:
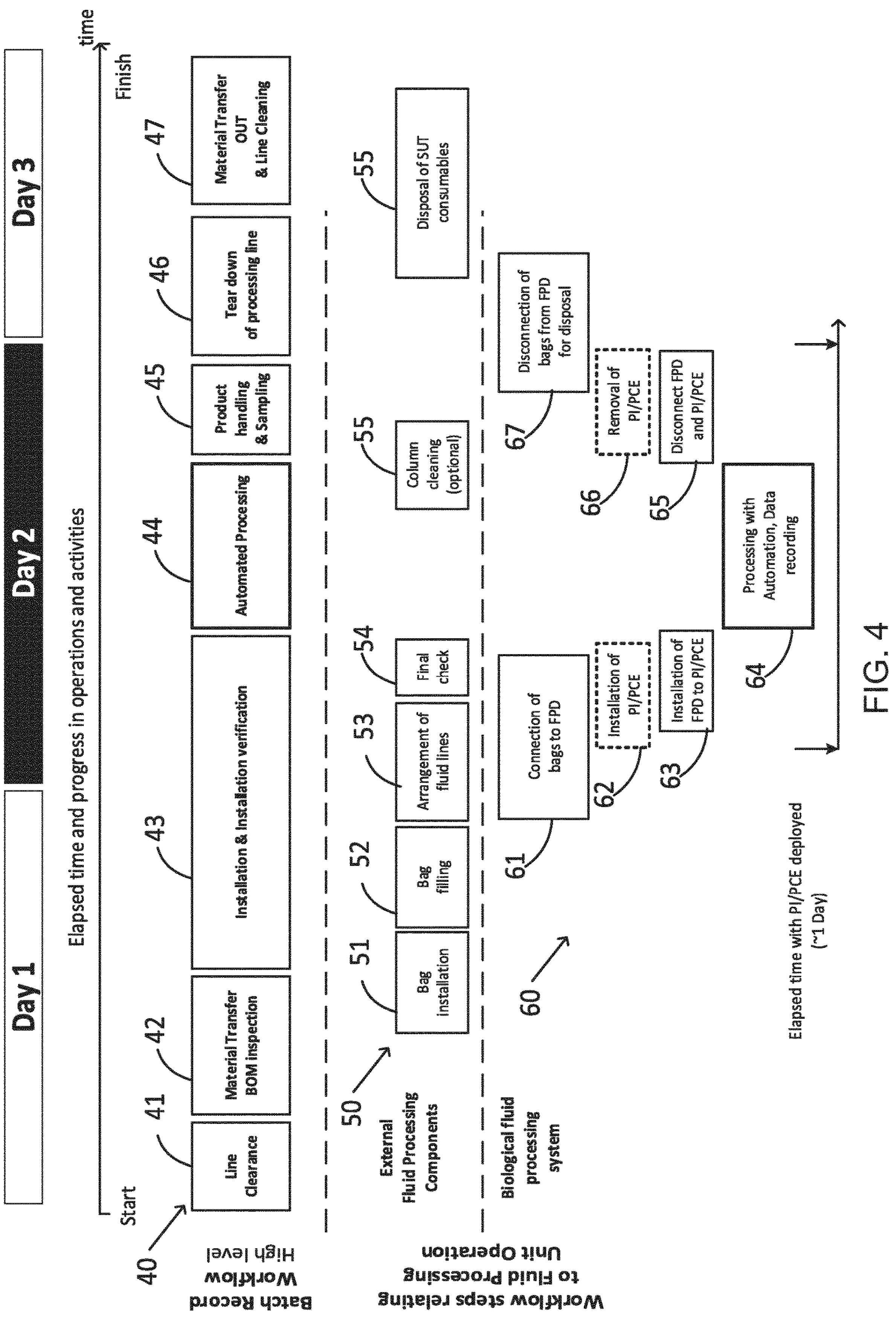
FIG. 4 illustrates schematically workflows relating to the in biological fluid processing system of FIG. 2.

In FIG. 4, examples of workflow schemes for setting up for manufacture, manufacture and tearing down after manufacture of a biopharmaceutical product using a biological fluid processing system as disclosed herein are illustrated.

The schemes comprise in the illustrated example a high-level batch record workflow 40.

The workflow scheme comprises workflow steps relating to fluid processing. The workflow steps relating to fluid processing are dividing into a first scheme illustrating a workflow 50 for handling external fluid processing components and a second scheme illustrating a workflow 60 for handling a biological fluid processing system.

In the illustrated example, the high level batch record workflow 40 starts with line clearance 41. Thereafter a step of material transfer and/or BOM inspection 42 follows. Thereafter, an installation and verification step for installation and verification 43 of the manufacture system is performed. Thereupon, automated processing 44 possibly with manual interactions is performed. Thereafter, a product handling and sampling step 45 is performed for handling the product and sampling manual activities. Thereafter follows a step of tearing down of processing line 46. Thereafter, follows a step of transferring out material and cleaning the processing line 47. In this step 47, single use products are disposed. Steps may be added and/or removed from this high-level workflow 40 and/or time requirements for executing steps may vary.

The first scheme illustrating the workflow 50 for handling external fluid processing components comprises a step for bag installation 51. The workflow 50 for handling external fluid processing components comprises further a step for bag filling 52, which refers to the example of a process requiring large volumes of liquids and buffers, thereby requiring filling of bags at the point of use.

The second scheme illustrating the workflow 60 for handling a biological fluid processing system comprises a step for connecting 61 the filled bag to a fluid processing device. Further, the workflow 60 for handling a biological fluid processing system may also comprise a step of installing a processing interface and/or a processing control element 62. The fluid processing device is then connected or installed 63 to the processing interface and/or processing control element.

As is clear from the workflow steps relating to fluid processing, the first scheme illustrating the workflow 50 for handling external fluid processing components comprises a step of arranging fluid lines 53 coordinated with the step of connecting the bag(s) to the fluid processing device. Further, the first scheme illustrating the workflow 50 for handling external fluid processing components comprises a step of a final check 54 coordinated with the connection of bag(s) to the fluid processing device 61, the possible step of installing the processing interface and/or processing control element 62 and the step of installing the fluid processing device to the processing interface and/or processing control element.

Thereafter, the second scheme illustrating the workflow 60 for handling a biological fluid processing system comprises a step of processing 64. The processing may be executed preferably with automation, either fully automated, or semi-automated. Data records may be obtained relating to the processing.

Further, the first scheme illustrating the workflow 50 for handling external fluid processing components may comprise a step of cleaning 55 such as column cleaning, for example. This step may be carried out at instances during processing 64 and/or after processing.

The second scheme illustrating the workflow 60 for handling the biological fluid processing system comprises a step of disconnecting the fluid processing device from the processing interface and/or processing control element 65 after the processing 64. The workflow 60 for handling the biological fluid processing system may further comprise a step of removal of the processing interface and/or processing control element 66. The workflow 60 for handling the biological fluid processing system comprises further a step of disconnecting any external fluid processing components from the fluid processing device 67.

Further, the first scheme illustrating the workflow 50 for handling external fluid processing components comprises further a step of disposal 55 of single use technology, SUT, consumables, if any.

The batch record workflow 40 and/or the workflow steps relating to fluid processing may be associated to instructions and data for the manufacture of the predetermined biopharmaceutical product. The instructions comprise for example Standard Operation Procedures, SOPs, and/or an electronic batch record, eBR. The instructions may belong to either level 2 or level 3 or a combination thereof in the different levels of providing manufacture support aligned with the ISA95 standard (by ISA, International Society of Automation).

For example, the instructions may comprise instructions for Line clearance 41. This instruction characteristically precedes or may be considered an initialization of the material transfer and/or BOM inspection 42.

The instructions may comprise instructions for transfer of consumables, and/or equipment and/or fluids and/or etiquettes. This instruction characteristically belongs to material transfer and/or BOM inspection 42 and/or installation 43.

The instructions may in a corresponding manner comprise instructions of the automated processing 44, the product handling and sampling 45, the tearing down of processing line 46 and the material transfer and line cleaning 47.

These schemes for manufacture of a predetermined biopharmaceutical product is as is apparent from the above only an example. High-level workflows and/or instructions may be added or removed. Also, the time line of FIG. 4 is only an example.

To sum up, the modularity of the system allows for installation and/or disconnection of the fluid processing device to the processing control element/processing interface in a separate step just before/after processing. Thus, the fluid processing device and processing element, when the processing element is at least partly comprised in a separate unit, may be utilized and/or prepared separately before for installation and/or disconnection of the fluid processing device. Therefore steps and processes deploying the modules of the system may be carried out in parallel and overall utilization of the modules can be significantly improved as the control units are not locked in during the setting up for processing and/or cleaning up after processing, for example.

Figure 5A:
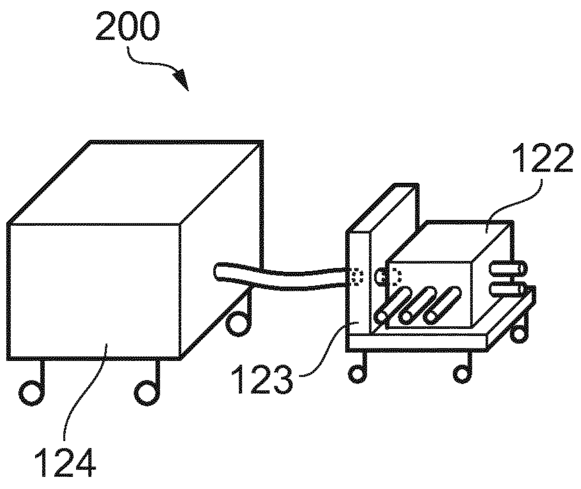
FIGS. 5*a, b, c, d* illustrate different set-ups of a modular fluid processing system of FIG. 2.
Figure 5B:
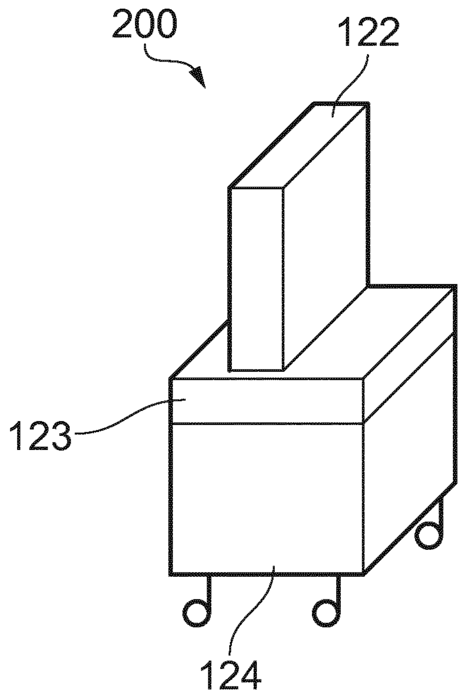
Figure 5C:
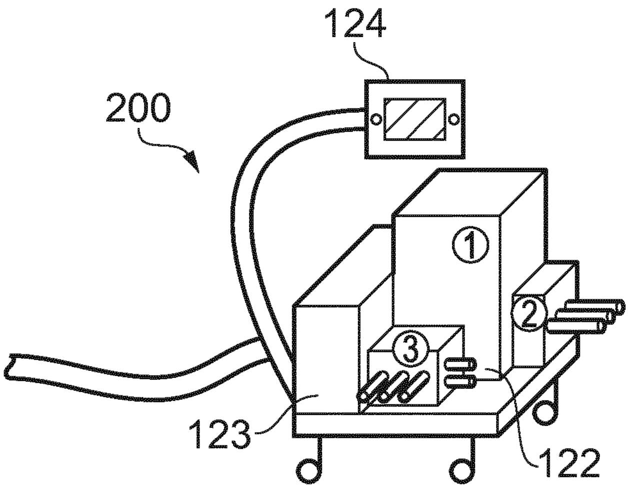
Figure 5D:
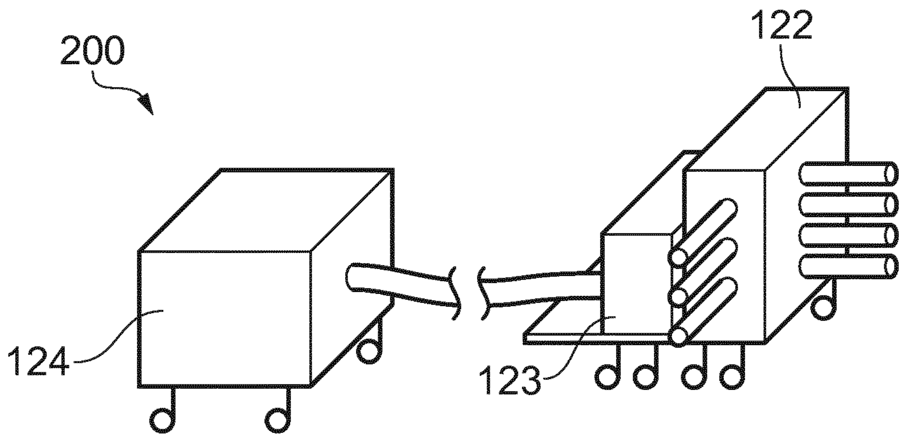

FIGS. 5*a, b, c, d* illustrate different set-ups of a modular fluid processing system 200. Different possibilities of arranging the processing control element, PCE, 124, processing interface, PI, 123 and fluid processing device, FPD, 122 are illustrated.

The modular fluid processing system 200 and/or its modules may be designed to obtain full three-dimensional modularity and 3D utilization of configurability and extensions The fluid processing device may be mounted on a simple frame or skid. Thereby mobility may be obtained. The mobility may be obtained by way of wheels mounted to the frame or skid. The fluid processing device may further be mounted on the frame or skid to provide structural support and stability of the cabinet, for example to avoid the risk for tilting, i.e. when the fluid processing device becomes connected to surrounding fluid lines (tubing, bags and tanks). The processing control element 124 may be designed with one or multiple rigid connection interfaces to the processing interface 123 and/or to the fluid processing device 122. Rigid connection interfaces are here considered as connectors or multi-connectors that provide electrical and/or pneumatic and/or mechanical interfaces required for communication, control etc. in the operation of the complete system, where the connection requires the submodules (processing control element, processing interface and/or fluid processing device) to assume a pre-defined physical orientation against each other. Typically, rigid connection interfaces are connectors that are positioned or mounted in wall of a cabinet comprising a submodule. Rigid connection interfaces are thereby designed without or with very limited flexibility in the connections, which is in contrast to flexible connection interfaces where the connector(s) are provided at the termination of flexible cables, connection lines or harnesses comprising said flexible cables and/or connection lines. Flexible connection interfaces allow by the flexibility of cables, connection lines and harnesses in between two submodules, that a high variability is provided for submodules to be connected concerning their relative physical position and/or distance toward each other. In one embodiment of the invention, flexible connection interfaces are utilized in between the processing control element and processing interface modules.

An advantage of utilizing flexible connection interfaces, especially in between processing control element and processing interface is that the processing control element may be positioned at a certain distance from the processing interface and the fluid processing device to avoid interfering with the setup of fluid processing components. For example, it may be preferable to position external fluid processing components such as vessels and fluid treatment devices close and with short distance to the f as this may help to reduce fluid holdup volume and increase processing efficiency. Being able to position the processing control element and its cabinet further away from the fluid processing device, the processing control element cabinet with its size and volume is not obstructing the fluid line assembly.

Further, when a connection of external fluid processing components to the fluid processing device shall be done prior to connecting the fluid processing device to the processing control element, the utilization of flexible connection interfaces and generous length in their flexible cables and lines allows for connecting fluid processing device and the processing control element without the need for rearranging external fluid processing components to allow for said connection.

Cables and connections between the processing control element and the processing interface may also be arranged to be obtained at a longer distance such that the processing control element is not in the direct vicinity of the processing interface. The processing control element and the processing interface may for example be in different rooms.

The modular biological fluid processing system may provide solutions, preferably also modular and mobile, which may provide some control, monitoring and/or documentation capabilities when using the fluid processing device and/or the processing interface while not being connected to the processing control element. Such solutions may be used as a complement or instead of functions otherwise provided by the processing control element and/or a HMI, processing element (computer) or memory comprised by or interacting with the processing control element. An example of said solutions providing control, monitoring and/or documentation capabilities is the scenario when connecting external fluid processing devices to the fluid processing device while the fluid processing device is not connected to the processing control element. Here, one may for example want to deploy readers for identification of tags and labels at the fluid lines and connectors, or wireless readers or interfaces to sensors. For example a wireless reader for reading tubing clamp sensors for monitoring open/close positions of tubing clamps (manual valves at the fluid lines to bags) can be used to manage fluids with or adjacent to the fluid processing device while the fluid processing device is not yet connected to the processing control element and valves in the fluid processing device may not be yet controllable as second valve actuators of the processing control element are not yet connected to first valve actuators in the fluid processing device. In another embodiment of the invention, an external solution providing control, monitoring and/or documentation capabilities may be utilized while the fluid processing device is connected to processing control element and/or processing interface, or both prior and during full assembly of processing control element, processing interface and fluid processing device modules forming a biological processing system. As a result, capabilities of the fluid processing system in its entirety are not compromised when utilizing modules of the system during certain workflow steps with prior or after utilizing all modules of the system as required for processing. Further, supporting modules may be added to the system during pre-and/or post processing workflow steps that provide functionality required during pre- and/or postprocessing.

FIG. 6*a*-6*d* illustrate examples for a modular design of a fluid processing device 922. In the illustrated example inlet/outlet manifolds connecting to external fluid processing devices are provided as submodules. Hence the inlet/outlet manifolds may be designed as modules of the fluid processing device. There may be advantages in providing the fluid processing device in submodules. Those submodules may then be used at the point of use. Thereby, ergonomics during connection of external fluid processing devices to inlets and outlets of the fluid processing device may be improved. Another advantage in providing submodules of the fluid processing device, and in especially providing modularity in the number of inlet and outlets, is improved flexibility and configurability at the point of use. A modular design as such may of course also be helpful in the production of the fluid processing device in the first place.

In the illustrated example, the fluid processing device 922 is designed as a flow path for a chromatography system comprising an inlet manifold 930 arranged to connect to one or a plurality of fluid supplying vessels. The fluid processing device 922 comprises further an outlet manifold 931 arranged to connect one or a plurality of fluid receiving vessels. The fluid processing device comprises further a column manifold 932 arrange to connect to a chromatography column. The inlet and outlet manifolds 930, 931, as well as the column manifold 932 are connected to a fluid flow path core 933, which typically comprises one or multiple pumps, sensors, and valves.

Typically, there is only one fluid conduit in between the fluid path core 933 and the outlet manifold 931. Thus, it is straightforward to connect the fluid path core 933 with the outlet manifold 931 for an operator at the point of use, as only a single fluid connection is to be established. Aseptic (sterile) connectors could be employed to maintain the sterility of the SUT assembly, if required. Hence, deploying the outlet manifold as a module and connecting the outlet connections to fluid receiving vessels may provide advantages prior to connecting the outlet manifold to the fluid path core may provide advantages in the workflow for reasons of ergonomics and improved user interaction, for allowing the outlet manifold to be provided pre-connected to one or several outlet connections and fluid receiving vessels etc.

At the inlet side of the fluid path core 933, typically one or two inlet manifolds 930 are connected to one or two pumps in the fluid path core. Again, one or two connections could be easily established by an operator at the point of use in order to take advantages in providing and/or deploying the inlet module(s) separately.

The fluid processing device further comprises a connection for connecting the fluid path core 933 to a processing interface of a fluid processing system.

Figure 6A:
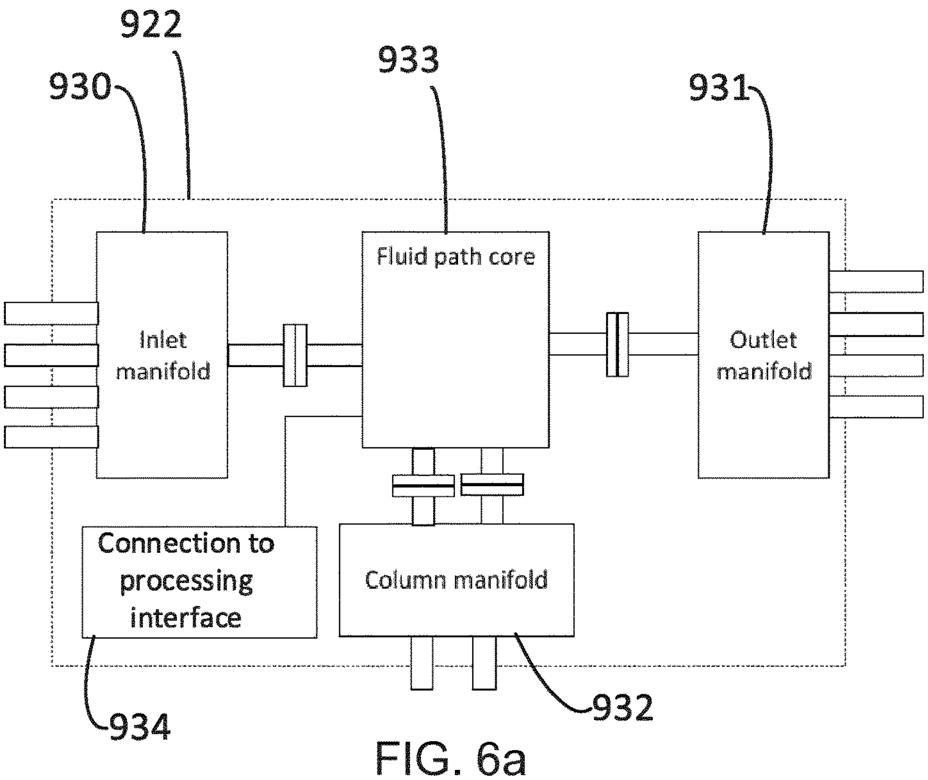
FIGS. 6*a, b, c, d* illustrates an example of a modular design of a fluid processing device of a modular fluid processing system.
Figure 6B:
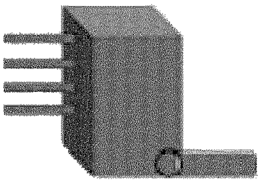
Figure 6C:
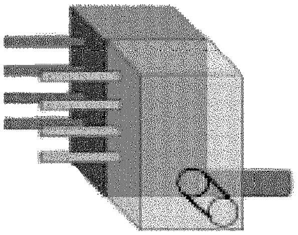
Figure 6D:
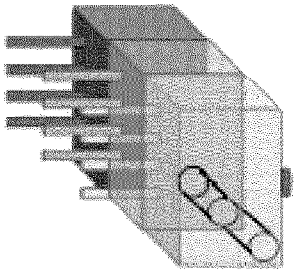

In FIGS. 6*b*, 6*c* and 6*d* modular manifolds are designed such that two or more manifolds can be connected to expand the number of inlets and/or outlets by mounting said manifolds adjacent to each other.

The modular manifold may be extended 'on demand' by adding another modular manifold during installation prior processing, during or in between process steps, for example for adding a fluid line to an additional fluid supplying or fluid receiving vessel or of adding another fluid treatment device in case that the capacity of a first fluid treatment device is not sufficient.

When using manifolds as submodules and by operating the manifolds and the corresponding valves in the fluid part core 933 by control from the valve control system of a processing control element, valve system of, pneumatic control of first actuators would equally be designed in a modular fashion. In particular, the routing and connection of pneumatic control lines would be designed modular and for easy and fail-safe assembly and operation.

The deployment of modular inlet and outlet manifolds at the point of use may provide improved ergonomic flexibility. When setting up a manufacturing process for manufacturing, it may be useful to establish the many connections between the inlets and outlets of the fluid processing device prior to connecting the inlet and/or outlet manifolds to the fluid processing device, for example when using a welder to connect external tubing to a manifold. The inlet and outlet manifolds could be moved to the welder for the welding operations, while the single fluid connection between the respective manifold and the fluid path core 933 can be established thereafter, for example employing a standardized aseptic connector.

Another advantage of deploying modular inlet and outlet manifolds at the point of use is to provide higher flexibility and configurability.

The fluid inlet interface may be formed at one side and the fluid outlet interface may be formed at another side, such as an opposite side of the cabinet. Thereby, a risk of installing wrongly may be minimized.

Figure 7:
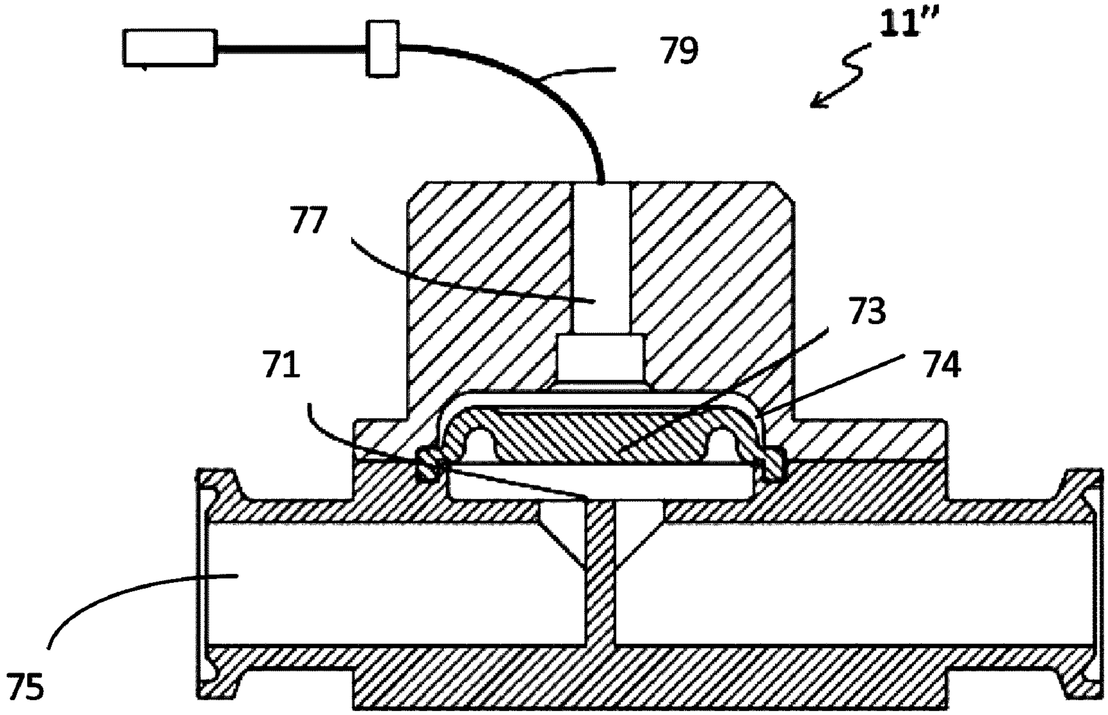
FIG. 7 illustrates an example of a valve and a first valve actuator according to an example of the invention.

In FIG. 7, an example of a first actuator and valve arrangement 11" of a fluid processing device is illustrated. Thus, in the illustrated exemplified valve arrangement 11", the first actuator is comprised in the valve.

The valves are for example provided as pinch valves and/or diaphragm valves. Each valve includes a first actuator which moves a wetted part component of the valve to assume a desired opening state, which may be achieved by pinching the wall of a tube or displacing a diaphragm in a diaphragm valve.

The valve arrangement 11" may be designed in a compact and cost-efficient way such that the first actuator is designed as a chamber 74 with a flexible wall, the wall being displaced and thereby changing the volume of the chamber in response to a fluid pressure defined by the second actuator in the processing control element. The fluid may be a liquid, however, a pneumatic system with pressurized gas, for example pressurized air, is preferable.

The valve arrangement is in the illustrated example formed by means of a valve seat and a flexible diaphragm 73, wherein the diaphragm is representing also the flexible wall in the chamber of the first actuator.

The valve arrangement 11" is capable of controlling the fluid flow of process fluid in a single-use flow path. Typical sizing of fluid path is between 1-32 mm in diameter, although smaller and larger flow path are also feasible.

In the example where the first actuators are pneumatic, the fluid processing device may comprise a "pneumatic distributor" that controls the pressurization of the (pneumatic) valves controlling the flow of process fluid inside the conduits of the single-use consumable. The "pneumatic distributor" is again a control valve arrangement fed by a common pressurized air supply.

In another embodiment, a diaphragm at the first actuator may be connected via a mechanical element (pin or actuator member) to the diaphragm in a diaphragm valve or to a pinching actuator pinching a tubing. In another embodiment, the first actuator may engage a lever in a lever or rocker valve.

In other embodiments, double diaphragms may be used to achieve security in seal integrity and avoiding contamination of either process fluid or pneumatic fluid in case of any leakage.

In detail, in the illustrated example, the diaphragm 73 is directly driven by pressurized air via conduit conduit 49 connected to the processing control element.

The valve arrangement 11" is designed such that the displacement of the wall of a chamber 74 of the first actuator is affecting the closing (or opening) of a fluid path 75 adjacent to the first actuator. In one example, a pneumatic chamber 74 of the first actuator is adjacent to the fluid conduit 75 of the process fluid, the fluid conduit of the process fluid is designed with a valve seat 71 and a flexible diaphragm 73, where the diaphragm 73 is representing also a flexible wall element in the pneumatic chamber of the first actuator. A pressurization of the first actuator's chamber to a pressure larger than the pressure of the process fluid will thereby force the diaphragm onto the valve seat in the process fluid conduit, thereby closing the valve. On the contrary, applying a pneumatic control pressure lower than the process fluid pressure to the first actuator's chamber will actively open the valve and pull the diaphragm toward or into the chamber of the first actuator. Thus, the wall of the chamber is pneumatically controlled by applying fluid pressure to the wall of the chamber and modulating said fluid pressure.

The valve arrangement 11" has a low holdup volume and minimum back-mixing as compared to the standard valve arrangements used in traditional systems. Further, the valve arrangement may be a disposable part that is cost efficient and of low mechanical complexity, and it provides great flexibility in spatial positioning and configurability of the fluid processing device, enabled by means of its design of a first actuator. Traditionally, first actuators for a pneumatic system are designed as hydraulic cylinders with moving pistons and moving seals, thereby requiring precision in the dimensions of the hydraulic cylinder and piston. Hydraulic cylinders are for example employed in the pinch valve actuators (first actuators) of the ÄKTA ready system. The design of the first actuators herein described first actuator allows for a very compact design of the fluid processing device, in especially for fluid processing devices comprising many valves. Three dimensional valve configurations at the fluid processing device are made feasible, also the positioning of valves inside a fluid processing module or cabinet, where it would be impossible to apply traditional first actuators that require positioning adjacent to the valve position. A compact design has advantages for the fluid processing operation as such, as it for example allows to minimize hold-up volume. In filtration, i.e. crossflow filtration for example, a low hold-up volume allows for more efficient processing and achieving higher final product concentrations. Other advantages with a compact flow path and fluid processing device are a low volume of the consumable, thereby improving ease of use in handling as well as reducing volume requirements for storage and transport of the consumables.

Figure 8:
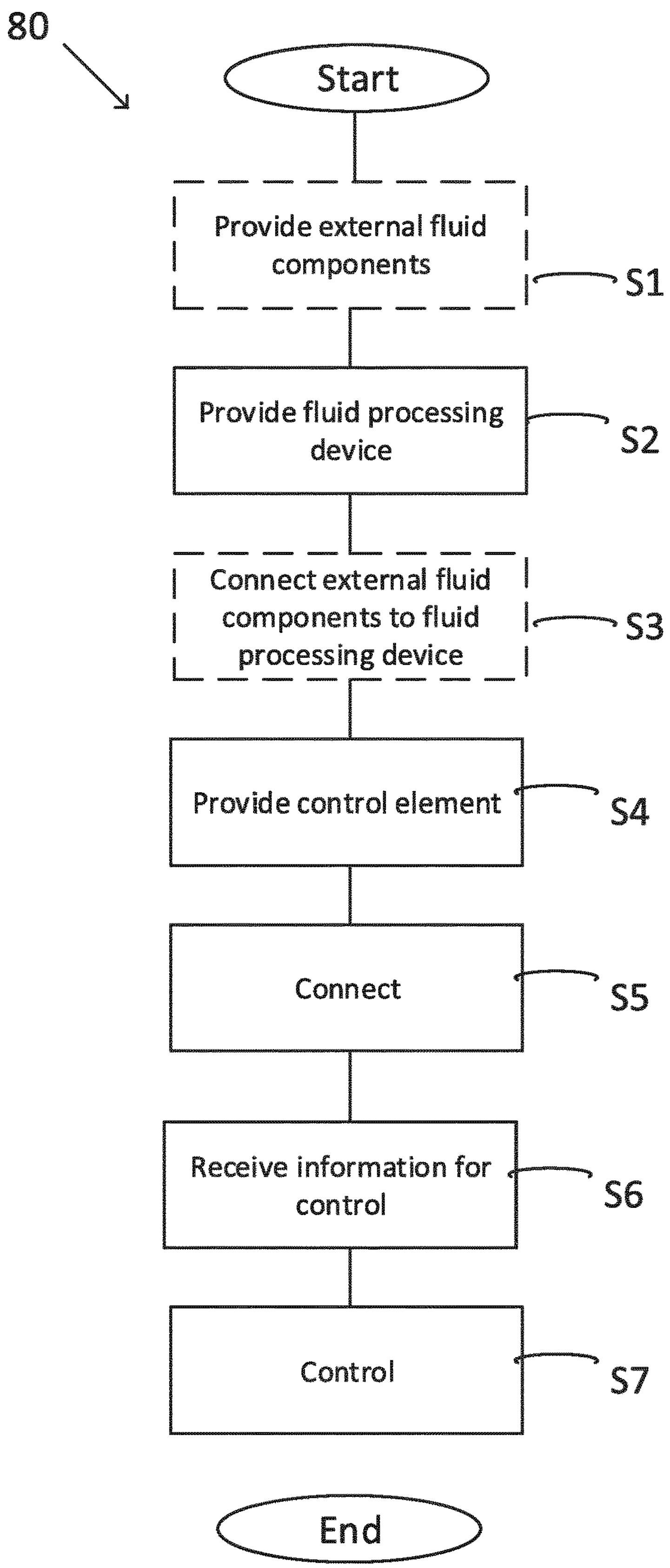
FIG. 8 is a flow chart schematically illustrating an example of a method for setting up a biological fluid processing system.

FIG. 8 relates to a method 80 for setting up a biological fluid processing system. The method comprises a step of providing S2 a fluid processing device comprising at least one fluid path, a pump for providing a pressure in the at least one fluid path, a valve arranged along said fluid path and a first actuator arranged to control the valve to assume a desired opening state of said fluid path.

The method further comprises a step of providing S4 a processing control element.

The method further comprises a step of connecting S5 the fluid processing device to the processing control element. Further, the fluid processing device may be connected to a processing interface. The processing interface may comprise a pump drive for driving the pump of the fluid processing device. In one example, at least parts of the processing interface is provided in a separate processing interface module.

The method further comprises a step of receiving S6 the information relating to a predetermined fluid processing device configuration and/or a predetermined processing interface configuration. This information may be received upon connection S5 or before connection, preferably when the processing control element is within a short-range communication distance from the processing interface and the fluid processing element.

The method further comprises a step of controlling S7 at least one pump drive for control of the pump and/or the valve based on the received information relating to the predetermined fluid processing device configuration and/or the predetermined processing interface configuration.

The method may further comprising steps of S1 providing external fluid components and connecting S3 said external fluid processing components to the fluid processing device prior to connecting the fluid processing device to the processing interface and/or processing control element.

The modularity of the system allows for installation and/or disconnection of the fluid processing device to the processing control element/processing interface in a separate step just before/after processing. Thus, the fluid processing device and processing element, when the processing element is at least partly comprised in a separate unit, may be utilized and/or prepared separately before for installation and/or disconnection of the fluid processing device. Therefore steps and processes deploying the modules of the system may be carried out in parallel and overall utilization of the modules can be significantly improved as the control units are not locked in during the setting up for processing and/or cleaning up after processing, for example.

Further, the automated controlling S7 of at least one pump drive for control of the pump and/or the valve based on the received information relating to the predetermined fluid processing device configuration and/or the predetermined processing interface configuration further decreases the time for setting up for processing.

Further, the flexibility of the system is high, as the processing control element controls based on the configuration of the processing interface and/or the configuration of the fluid processing device. Thus, the respective configuration is associated to corresponding processing control. The processing control associated to the respective configuration may be adapted at any time in software.

The invention claimed is:

1. A biological fluid processing system, comprising:
- a fluid processing device comprising:
  - at least one fluid path;
  - a pump for providing a pressure in the at least one fluid path;
  - a valve arranged along said fluid path; and
  - a first actuator arranged to control the valve to assume a desired opening state of said fluid path;
- a processing interface comprising a pump drive for driving the pump of the fluid processing device;
- and
- a processing control element comprising a pump control system arranged to control at least the pump drive and a valve control system arranged to control the first actuator;
- characterized in that the system is modular such that it comprises a plurality of physically separable device modules; and
- the fluid processing device is comprised in a fluid processing device module having a predetermined fluid processing device configuration; and
- the processing interfaces have predetermined processing interface configuration; and
- the processing control element is arranged to
  - receive information relating to the predetermined processing interface configuration and/or the predetermined fluid processing device configuration of the fluid processing device module; and
  - control the at least one pump drive and/or the valve based on the received information relating to the predetermined fluid processing device configuration and/or the predetermined processing interface configuration.

2. The biological fluid processing system according to claim 1, wherein the processing control element comprises or is connected to a user interface for input of information relating to the predetermined fluid processing device configuration and/or the predetermined processing interface configuration.

3. The biological fluid processing system according to claim 1, wherein the processing interfaces are comprised in a processing interface module having the predetermined processing interface configuration, wherein the processing control element is arranged to receive information relating to the predetermined processing interface configuration of the processing interface module.

4. The biological fluid processing system according to claim 1, wherein the processing control element comprises a receiver arranged to receive information relating to the predetermined fluid processing device configuration and/or the predetermined processing interface configuration, wherein the received information may be communicated from an RFID tag associated to the processing interface module and/or fluid processing device module and/or wherein the received information is obtained via machine-vision.

5. The biological fluid processing system according to claim 4, wherein the receiver is configured to receive information comprising the identity of the fluid processing device module and/or the identity of the processing interface module.

6. The biological fluid processing system according to claim 1, wherein the fluid processing device module is provided with own structural support.

7. The biological fluid processing system according to claim 1, wherein the first actuator is comprised in the valve.

8. The biological fluid processing system according to claim 1, wherein the valve is a diaphragm valve.

9. The biological fluid processing system according to claim 1, wherein the first actuator is arranged to move the valve to assume the desired opening state of the valve.

10. The biological fluid processing system according to claim 1, wherein the first actuator is designed such that displacement of a wall of a chamber of the first actuator affects the opening state of the fluid path.

11. The biological fluid processing system according to claim 10, wherein the valve and first actuator is formed by means of a valve seat and a flexible diaphragm.

12. The biological fluid processing system according to claim 10, wherein the wall of the chamber is pneumatically controlled.

13. The biological fluid processing system according to claim 10, wherein the wall of the chamber is pneumatically controlled by applying fluid pressure to the wall of the chamber and modulating said fluid pressure.

14. The biological fluid processing system according to claim 1, wherein the processing control element comprises a second actuator for control of the first actuator.

15. The biological fluid processing system according to claim 1, wherein the fluid processing device is a single-use technology product.

* * * * *